(12) United States Patent
Essemiani et al.

(10) Patent No.: US 7,906,018 B2
(45) Date of Patent: Mar. 15, 2011

(54) SYSTEM FOR TREATING WASTEWATER

(75) Inventors: Karim Essemiani, Boulogne Billancourt (FR); Valery Ursel, Saint-Maurice (FR)

(73) Assignee: OTV S.A., Saint-Maurice Cedex (FR)

( * ) Notice: Subject to any disclaimer, the term of this patent is extended or adjusted under 35 U.S.C. 154(b) by 0 days.

(21) Appl. No.: 12/540,637

(22) Filed: Aug. 13, 2009

(65) Prior Publication Data

US 2009/0301948 A1  Dec. 10, 2009

Related U.S. Application Data (62) Division of application No. 10/583,802, filed as application No. PCT/FR2004/003323 on Dec. 21, 2004, now Pat. No. 7,648,638.

(30) Foreign Application Priority Data

Dec. 22, 2003  (FR) ..................... 03 15161

(51) Int. Cl.
*C02F 1/52* (2006.01)
(52) U.S. Cl. ............... 210/195.1; 210/195.3; 210/205; 210/519; 210/521; 366/264; 366/306; 422/227
(58) Field of Classification Search ............... 210/195.1
See application file for complete search history.

(56) References Cited

U.S. PATENT DOCUMENTS

| | | | | | |
|---|---|---|---|---|---|
| 2,295,714 A | * | 9/1942 | Clark | .......................... | 210/208 |
| 2,377,545 A | * | 6/1945 | Felsecker | ..................... | 210/208 |
| 2,419,004 A | * | 4/1947 | Bicker et al. | ................. | 210/202 |
| 3,473,661 A | * | 10/1969 | Duff | ............................. | 210/791 |
| 3,552,934 A | * | 1/1971 | Claydon et al. | ............... | 422/231 |
| 3,635,346 A | * | 1/1972 | Zuckerman et al. | .......... | 210/208 |
| 3,779,910 A | * | 12/1973 | Chatfield | ...................... | 210/712 |
| 4,303,517 A | * | 12/1981 | Love et al. | .................... | 210/208 |
| 4,367,141 A | * | 1/1983 | Dorombozi et al. | .......... | 210/145 |
| 4,775,468 A | * | 10/1988 | Peterson | ....................... | 210/188 |
| 5,152,888 A | * | 10/1992 | Koyama | ..................... | 210/195.3 |
| 5,800,717 A | * | 9/1998 | Ramsay et al. | ............... | 210/711 |
| 6,824,692 B2 | * | 11/2004 | Binot et al. | .................... | 210/709 |
| 7,083,050 B2 | * | 8/2006 | Nyman et al. | ................. | 210/519 |

FOREIGN PATENT DOCUMENTS

| | | | |
|---|---|---|---|
| EP | 0680933 | | 11/1995 |
| FR | 1392469 | | 3/1965 |
| FR | 2119272 | | 4/1972 |
| FR | 2268757 | | 11/1975 |
| FR | 2380056 | | 9/1978 |
| SU | 1738319 | * | 2/2001 |
| WO | 9735655 | | 10/1997 |
| WO | 03070645 | | 8/2003 |
| WO | 2005065832 | | 7/2005 |

* cited by examiner

*Primary Examiner* — Peter A Hruskoci
(74) *Attorney, Agent, or Firm* — Coats & Bennett, PLLC (57) ABSTRACT

A method and apparatus for treating wastewater. The apparatus comprises a reactor having a flow channel generally centrally located in a reactor and immersed in the water or wastewater in the reactor. An agitator is disposed within the flow channel and induces water or wastewater to enter the open upper end thereof and to move downwardly through the flow channel where the water or wastewater is discharged via a flow divider. A reagent is injected into the water or wastewater and the agitator within the flow channel serves to mix the reagent with the water or wastewater passing therethrough and in the process causes at least a slightly turbulent and downward axial flow through the flow channel.

17 Claims, 2 Drawing Sheets

SYSTEM FOR TREATING WASTEWATER

The present application is a divisional patent application of U.S. patent application Ser. No. 10/583,802 filed on Jan. 9, 2007, now U.S. Pat. No. 7,648,638 which is a U.S. National Stage application of PCT Application No. PCT/FR2004/003323, with an international filing date of Dec. 21, 2004. Applicant claims priority based on French application serial no. 0315161 filed Dec. 22, 2003. The contents of these applications and patent are expressly incorporated herein by reference.

I—TECHNICAL FIELD OF THE INVENTION

The invention relates to a method and a reactor for the treatment by flocculation of a raw fluid to be treated. The method and the reactor can be used in particular for treating industrial process water, drinking water and municipal or industrial waste water.

II—PRIOR ART

Various fluid treatments, in particular in the field of water treatment, involve mixing a raw fluid to be treated with a secondary fluid or flow in order to make the secondary flow react with components of the main fluid; in practice the secondary fluid contains a flocculating agent and it usually contains a granular material on which flocs resulting from the action of the flocculating agent on the impurities of the raw fluid to be treated are formed; this process is known as ballasted floc physical-chemical treatment; the fluids are usually mixed and reacted in full-mixing open reactors equipped with axial-flow vertical-shaft agitators.

In principle a physical-chemical reaction treatment involves dispersing the secondary fluid or fluids in the raw fluid to be treated and intensive mixing followed by as short as possible a reaction time with stirring at a low intensity (compared to the intensive mixing step), these steps usually leading to the use of a plurality of vats or reactors in series.

The possible existence of a bypass (short circuit) between the vat inlet and outlet and the fact that in practice use of the volume of the vat is incomplete, as is easily demonstrated by mathematical modeling linked to physical models, usually lead to increasing the size of the reactors and/or to the use of additional agitation power. This induces an increase in the investment and operating costs, however. Furthermore, it is standard practice to have the inlet and the outlet of a given vat at the greatest possible distance from each other, for example by using a low-level inlet at one end of the vat and a high-level outlet at the other end, although this proves to be a problem if it is necessary to connect a plurality of vats in series.

What is more, to prevent rotation of the liquid mass, usually called a vortex, which has been recognized as compromising mixing performance, it has already been proposed to place vertical baffles against the lateral walls (see "Mixing in the chemical industry", Sterbacek and Tausk, Pergamon Press, 1965, pp 278-301). According to that document, adding vertical baffles increases turbulence (and therefore improves mixing) provided that the width of the chicanes is from 0.056 to 0.12 times the diameter of the agitator and it is preferable for the baffles to be in the flow rather than against the walls. In fact the above document also mentions, for historical reasons, a cruciform baffle formed of two vertical walls mounted on the bottom of the vat, near the agitator, but indicates that the process is then difficult to control and the circulating liquid rapidly becomes contaminated with solid particles. It also indicates that these walls induce an increase in power consumption.

In the case of deep vats, it is known in the art to dispose a plurality of mobiles in the volume of the vat, along the agitation shafts, to increase the fraction of the volume in which turbulence is induced; it has nevertheless been realized that these stacked mobiles can be dispensed with by disposing a concentric tube (flow-guide) around the mobile, which is mounted at the tube outlet (see the 1965 book cited above). A flow-guide of this kind acts like an aspiration tube, contributes to increasing the fraction of the volume that is stirred and has the advantage of allowing internal recirculation. However, this aspiration effect is often associated with a vortex type rotation movement.

In the field of water treatment, and in particular with regard to the flocculation step, it has already been proposed, for example in the document FR-2 553 082, to produce a reaction chamber with a central area provided with an upward axial flow screw and a peripheral area around the central area. The water to be treated, where appropriate with the necessary reagents added to it, which has been mixed with sludge obtained previously during the treatment, is introduced at the base of the central area, and an additive such as a polymer is introduced into this area. This produces internal recirculation, the peripheral area constituting a slow flocculation area. The central area is delimited by a vertical tube disposed in a parallelepiped-shaped enclosure, and so the central area may be described as a double area. The mixture then enters an intermediate enclosure before passing into a separation area. Note that an architecture of this kind involves a large number of areas.

There is also known, from the document WO-98/14258, an installation in which a central internal recirculation enclosure includes a central tube containing one or more upward axial flow screws, a granular material inlet and a flocculating agent inlet. The raw fluid to be treated is introduced at the base of the tube, overflows into the annular area from the central area and then, depending on the size of the flocs, rises either inside the tube, to be recirculated, or in the peripheral clarification area. The screw produces just sufficient turbulence to maintain the solids in suspension without shearing them, which can lead to slow mixing and therefore degrade performance.

III—TECHNICAL PROBLEMS AND SOLUTIONS ACCORDING TO THE INVENTION

The invention aims to provide an enhanced combination of compactness, efficacy and moderate cost, whether from the plant or operation point of view.

Accordingly, the invention aims to provide a flocculation reactor which, thanks to one or more agitators and the delimitation of areas with different levels of agitation, improves the kinetics of the reaction between a raw fluid to be treated and a flocculating agent (and where applicable a granular material forming a flocculation ballast), increases the usable fraction of the volume of the reactor and reduces the risk of bypassing the process (i.e. the risk of no circulation occurring in the areas with different levels of agitation), with a moderate level of the power devoted to the agitation levels.

The invention further aims to provide a method of treating a raw fluid to be treated by flocculation and separation, the method combining, within the overall dimensions of a single vat, two areas with different levels of agitation, and maximizing the turbulence for a given energy level and for a given contact time.

A subsidiary aim of the invention is to facilitate the series connection of a plurality of reactors of the same or different types and of the same or different sizes, either at the time of manufacture or subsequently.

To this end, the invention firstly proposes a method of treating a raw fluid to be treated by flocculation and separation charged with impurities in suspension, colloidal impurities or dissolved impurities, wherein:

the raw fluid to be treated is circulated with a flocculating reagent in a flocculation vat to obtain a flocculated mixture in which the impurities form flocs, and this flocculated mixture is circulated in a separation area in which the flocculated mixture is separated into clarified effluent and sludge containing the flocs, characterized in that:

a completely immersed flow-guide tube delimits a central area in the flocculation vat in which agitation (8) brings about turbulent axial flow of the mixture of the raw fluid to be treated and the flocculating agent in an axial direction of the flow-guide tube, that flow is divided (5) angularly by means of a static system opposing rotation of the flow disposed at the flow-guide tube outlet, this mixture is allowed to circulate in an opposite direction in a peripheral area (3) around the central area in order to reach the inlet of the central area, and a fraction of the mixture is passed to the separation area.

Note that the invention therefore teaches the use of a static device opposing rotation of the fluid at the outlet from the flow-guide tube to combine delimitation of a central area with a high level of agitation from a peripheral area with a lower level of agitation with an angular distribution of the outflow from the central area, so that turbulence is maximized and dead areas escaping the circulation induced in the volume of the central and peripheral areas are minimized. As stated above, using a static system to prevent the rotation of a flow had been abandoned as being difficult to control and had been proposed only in combination with an agitator; the person skilled in the art would therefore have had no reason to think that a static system of this kind could contribute to solving the stated technical problem. Also, there has been nothing, even drawing inspiration from prior art solutions using a flow-guide in a flocculation area, to suggest that it might be beneficial to use a static system of this kind in combination with a flow-guide.

According to preferred features of the invention, which may where appropriate be combined:

the flow in the central area is maintained at a flowrate from 1 to 20 times the inlet flowrate of the raw fluid to be treated, which corresponds to sufficient recirculation to reduce the risk of bypassing the system and to induce sufficient turbulence to ensure good mixing without necessitating excessive consumption of energy, the peripheral area is divided into an upstream peripheral area communicating with the inlet into the flocculation vat for raw fluid to be treated and a downstream peripheral area communicating with the flocculated mixture outlet, so as to cause the raw fluid to be treated that enters the flocculation vat to enter the central area at least once before passing to the separation area, which of course contributes to avoiding bypassing the system without significant consumption of energy and without involving a large number of recirculation cycles, the turbulent axial flow of the mixture is vertical, which represents a proven conventional configuration, the vertical turbulent axial flow is brought about by agitation at mid-height in the central area, which contributes to obtaining good aspiration movement at the inlet of the central area and good discharge at its outlet, therefore with an angular distribution at that outlet, without requiring more than one agitator, the turbulent axial flow of the mixture is downward and the mixture is divided angularly over at least substantially two thirds of the height between the level of the outlet from the central area and the level of the bottom of the flocculation vat; it is worth mentioning that this is the opposite of the direction used at present when there is internal recirculation in a flocculation area; however, recent modeling studies have shown that, in contrast to what the person skilled in the art might think, it is entirely realistic to use a downward movement in combination with a static angular distribution system without this inducing unwanted contamination of the latter system by flocs being formed or growing; selecting a downward direction avoids causing wavelets on the surface as a consequence of the turbulence induced and uses the vat bottom to bring about a rapid change in the direction of flow of the mixture between the central area and the peripheral area.

In the case of downward movement, it is preferable if:

the mixture is divided angularly over substantially all of the height between the level of the central area and the level of the bottom of the flocculation vat, which guarantees an angular distribution of the whole flow leaving the flow-guide tube, the flow-guide tube delimiting the central area is disposed so that its bottom end forming its outlet faces the bottom of the flocculation vat at a distance from ⅓ to ⅔ the average width of the tube therefrom, which contributes to reversing the direction of flow with no great risk of unwanted slowing of the flow, the flow-guide tube delimiting the central area is disposed so that its top end forming its inlet faces the surface of the contents of the flocculation vat at a distance from ⅓ to ⅔ of the average width of the tube therefrom, which contributes to ensuring efficient feeding of the flow-guide tube without inducing unwanted surface movements, the peripheral area is divided over an upper portion of its height into an upstream peripheral area communicating with the inlet into the flocculation vat for the raw fluid to be treated and a downstream peripheral area communicating with the flocculated mixture outlet, so as to cause the raw fluid to be treated entering the flocculation vat to enter the central area at least once before passing to the separation area, which is a particularly simple way to obtain the advantages cited above in respect of the general use of this kind of division, said division is effected over substantially the upper half of that height, which represents a height sufficient to minimize the risk of circumventing the central area.

According to other preferred features of the method of the invention:

the raw fluid to be treated enters and the flocculated mixture leaves substantially at the level of the inlet area of the flow-guide tube, which contributes to allowing the series connection of installations for implementing the method and participates in efficient guidance of the fluid to be treated towards the central area and of the mixture that has circulated in the peripheral area, the flocculating agent is a natural, mineral or synthetic polymer, the flocculating reagent with which the raw fluid to be treated is mixed in the flocculation vat is introduced into the fluid to be treated upstream of said vat, alternatively, the flocculating reagent with which the raw fluid to be treated is mixed is introduced into the flocculation vat, for example between the inlet of the flocculation vat and the inlet of the flow-guide tube; however, it is recommended that the flocculating reagent is introduced into the central area, preferably at the boundary of the central area, which ensures very fast mixing with the fluid to be treated; this effect is reinforced if at least a fraction of the flocculating reagent is injected annularly at the periphery of the inlet of the central area and coaxially with the flow-guide tube, a powder is mixed with the raw fluid to be treated in the flocculation vat, and is preferably a ballast consisting of an insoluble granular material heavier than the raw fluid to be treated, to serve as ballast for the flocs being formed or growing; the ballast advantageously consists of fine sand with a particle size range from 20 to 300 microns, the cost price of which is particularly reasonable, the sludge is treated at the outlet from the separation area, where ballast is recovered and recycled to the flocculation vat, which avoids losing the powder in the sludge that is discarded on reaching the separation area outlet, as well as reducing its volume, the raw fluid to be treated is mixed with coagulating agent before it is introduced into the flocculation vat, which contributes all the more to the efficacy of final separation if the raw fluid to be treated is water to be treated; in this case, the water to be treated is preferably mixed with a coagulating agent including a mineral salt such as an iron or aluminium salt before it is introduced into the flocculation vat, separation is effected by sedimentation or flotation, advantageously with the assistance of separation aid members such as inclined or vertical tubes or plates; the flocculated mixture is advantageously introduced tangentially into the separation area so as to combine a vortex effect with the sedimentation effect, which improves separation for a given treatment time or accelerates the treatment for a given level of separation.

Another aspect of the invention proposes, for implementing a preferred embodiment of the methods a reactor for treating a raw fluid to be treated by flocculation charged with impurities in suspension, colloidal impurities or dissolved impurities, including a vat having a fluid inlet, a fluid outlet and a flocculation area in a bath in which the fluid to be treated is mixed with a flocculating agent, said reactor including:

a flow-guide tube open at both ends and disposed vertically so that it is completely immersed in the bath in the vat but remains at a distance from the bottom of the vat, delimiting a central area from a peripheral area, the central and peripheral areas communicating with each other at both ends of the tube and the peripheral area communicating with the fluid inlet and outlet, a vertical-axis agitator disposed in the tube so as to generate therein vertical turbulent axial movement, a cruciform baffle formed of a plurality of vertical walls extending horizontally from a common edge substantially aligned with the axis of the agitator, on the downstream side thereof, so as to divide angularly the flow towards the peripheral area leaving the tube.

A reactor of the above kind has the advantages described hereinabove in the case of using the method with a vertically downward turbulent movement.

According to preferred features of the invention, in some instances analogous to those mentioned hereinabove with regard to the method of the invention:

the flow-guide tube has a constant section, which contributes to ensuring a fast flow of the mixture, the flow-guide tube has a cylindrical shape (in the narrow sense of the term, namely that its section is a circle), which represents a particularly simple structure; alternatively, the section is a regular polygon, etc., the agitator is disposed substantially at mid-height in the tube, the flow-guide tube has a diameter from 102% to 120% of the diameter of the agitator, which ensures good stirring throughout the section of the flow-guide tube, the hydraulic diameter of the central area is from 40% to 60% of the average width of the flocculation area formed by the central area and the peripheral area, the agitator is disposed and driven so as to generate a downward vertical movement in the tube, the cruciform baffle being disposed between the bottom of the flow-guide and the bottom of the vat, the tube has a bottom end facing the bottom of the vat at a distance from ⅓ to ⅔ of its diameter therefrom, the tube has a top end facing the surface of the bath contained in the vat at a distance from ⅓ to ⅔ of its diameter therefrom, the distance between the bottom end of the tube and the bottom of the vat and the distance between the top end of the tube and the level of the bath are at least approximately 50% of the diameter of the tube, the cruciform baffle has a height substantially equal to at least ⅔ of the distance between the bottom end of the tube and the bottom of the vat, the cruciform baffle has a height substantially equal to the distance between the bottom end of the tube and the bottom of the vat, the vertical walls of the cruciform baffle extend over a horizontal distance substantially from ¾ to 5/4 of the radius of the tube, which ensures that all or virtually all of the flocculated mixture is distributed angularly; the vertical walls of the cruciform baffle preferably extend over a horizontal distance substantially equal to the radius of the flow-guide tube, the cruciform baffle comprises four walls offset at 90° around the axis of the flow-guide tube, which represents a particularly simple structure (two plates crossing at a right angle), two of the walls are disposed transversely to the direction in which the raw fluid to be treated enters the flocculation vat, which contributes to good division of the flow, vertical walls divide the peripheral area between said inlet and outlet areas over at least a portion of the total height between the bottom of the vat and the surface of the bath, which helps to guarantee that the raw fluid to be treated passes through the flow-guide tube at least once, these vertical walls extend over a vertical distance from 40% to 60% of the total height, which is a good compromise relative to the height, to ensure good efficiency without using up too much baffle area, the reactor includes two or more vertical baffles extending substantially over the upper half of the vat, between the flow-guide tube, the fluid inlet and the fluid outlet, respectively, so as to cause the fluid to be treated to enter the central area between the fluid inlet and the fluid outlet at least once, because these walls are most effective in the upper portion, at the level of the flow-guide tube inlet, the vertical walls extend over a height between the main fluid inlet level and the level of the agitator, the vertical walls extend from the periphery of the peripheral area to the tube, which ensures good partitioning of the peripheral area, the inlet and outlet areas are near the level of the surface and each is provided with a transverse plate facing the inlet and the outlet, respectively, to form a siphon, which helps to ensure regular arrival of fluid to be treated and to prevent unwanted movement on the bath surface, it further comprises a flocculating reagent injection tube connected to a supply of flocculating reagent, the flocculating reagent injection tube is situated between the inlet for raw fluid to be treated and the inlet of the flow-guide tube; the reactor preferably includes an annular flocculating reagent injection tube coaxial with the inlet of the flow-guide tube, it further comprises a powder injection tube connected to a supply of powder, the supply of powder is a supply of fine sand, the vat includes a single flocculation area including a tube, although the invention also covers situations in which the same vat comprises a plurality of juxtaposed flocculation areas.

The invention also provides a fluid treatment installation including a reactor of the type cited above and a separation area connected to the outlet from the vat of that reactor.

Preferably:

the reactor comprises a powder injection tube connected to a powder supply and the separation area includes an outlet connected to a powder recovery system and adapted to collect sludge containing flocs, said powder supply being connected to said recovery system, the separation area is a sedimentation unit disposed on the downstream side of the vat, the separation area is a sedimentation unit around the vat.

Accordingly, in a particularly beneficial combination of features of the invention, the flow-guide tube is disposed above a cruciform baffle, the two devices advantageously having at least approximately the same diameter. The recommended pumping direction is downwards, to allow the introduction of one or more secondary flows or fluids at the surface, thereby ensuring continuous control of the injection thereof. Although, to prevent deposition areas, the person skilled in the art has ruled out horizontal bottom walls of this kind, the steep velocity gradients that the cruciform baffle produces in the lower portion of the vat (in producing turbulent kinetic energy) have the advantage of preventing the formation of deposition areas.

The combined effect of the above systems is to convert a major portion of the radial component of the screw of the agitator into an axial component, thereby significantly increasing the pumping throughput for the same absorbed power.

It is worth making the following remarks in relation to preferred embodiments of the invention:

The presence of two perfectly delimited areas having radically different mixing intensities means that functions usually necessitating two vats with different mixing intensities can be accomplished in the same vat.

The use of a single vat having two areas with different mixing intensities means that the two functions can be implemented with a single agitator instead of two.

For exactly the same usable volume, as a result of the reduction in dead areas resulting from improved control of mixing intensity and homogeneity, the total volume of a single vat may be significantly less than that of two joined vats.

For the same treatment efficiency, the same consumption of reagent and the same pumping throughput, the energy consumption may be reduced through the conversion of a major portion of the radial flow into axial flow.

In deep vats that normally use a plurality of stacked mobiles, by eliminating the consumption specific to the additional mobiles and improving efficiency by using the new design, the presence of the flow-guide with its associated cruciform baffle means that the same hydraulic effect can be achieved with a single mobile and using less electrical power.

There may be two vertical baffles filling the space between the flow-guide and the vat completely and disposed only in the upper half of the liquid depth; in this case, they are wider and shorter than indicated in the literature. In the horizontal plane they are parallel to the inlet walls and therefore parallel to the outlet walls.

The cruciform baffles preferably have a diameter equal to that of the flow-guide and a height contained between the flow-guide and the bottom of the vat.

By virtue of the advantageous combination of flow-guides, surface baffles, cruciform baffles, feed and outlet areas and agitator positioning and secondary fluid injection mode, the present reactor can achieve an optimum performance improvement.

IV—DESCRIPTION OF THE INVENTION

Objects, features and advantages of the invention emerge from the following description, which is given by way of illustrative and nonlimiting example and with reference to the appended drawings, in which.

REACTOR SHAPE

Figures 1, 2:
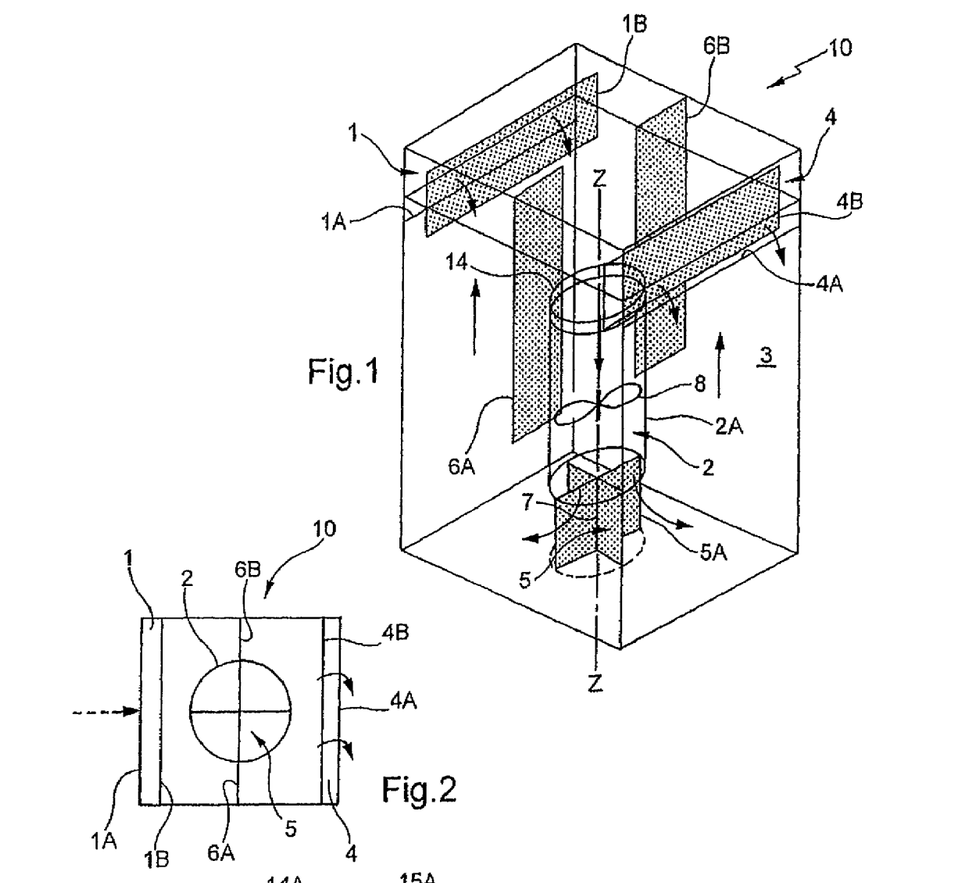
FIG. 1 is a diagrammatic perspective view of a preferred embodiment of a reactor of the invention.
FIG. 2 is a diagrammatic plan view of the reactor.

The reactor 10 shown in FIGS. 1 and 2 is of rectangular shape in order to facilitate connecting a plurality of reactors of the same type in series. In a variant that is not shown, the reactor may be square, which may be beneficial given the symmetry of the central area (see above).

It should be noted that most features described hereinafter are equally applicable to circular reactors (see FIG. 5), which are also within the scope of the invention, the results obtained being practically identical.

The preferred embodiment of the reactor 10 considered here generally comprises:

a fluid inlet area 1 receiving a raw fluid to be treated, often constituting turbulent flow and into which a first reagent, such as a coagulating reagent of any appropriate type known in the art, may already have been injected, a high dissipated energy central area 2 inside a tube 2A serving as a flow-guide for a flow generated by an agitator 8 and in which the raw fluid to be treated is dispersed and mixed completely with at least one flocculating reagent; in line with this tube is a cruciform baffle 5, a low-energy peripheral area 3 outside the flow-guide, in which the required flocculation is completed, a fluid outlet area 4 that advantageously dissipates the stirring energy and evenly divides the mixed flocculated fluid, which here exits across the full width of the vat, in order to encourage solid-liquid separation in a downstream separator reactor, if any, a set of vertical baffles 6A and 6B forming deflectors to minimize bypassing between the inlet and the outlet and making mixing more efficient.

To facilitate the (initial or later) chaining of a plurality of treatment steps based on the same principle, the inlet and the outlet of each reactor are disposed at substantially the same level, preferably in the upper portion, substantially at the level of the tube inlet, here at the surface; this also minimizes dynamic bypassing and enables any floating material to be evacuated in the downstream direction, for example by raising the level of the bath above spillways in the fluid outlet or by modifying the position of the spillways.

Inlet Area 1

The raw fluid to be treated, also known as effluent, is introduced into each reactor at the surface (as shown in FIG. 1) and across its entire width (via a spillway 1A, immersed or not, in practice formed by the lower edge of a slot defining the inlet in the wall of the reactor), or in an underflow arrangement (this variant is not shown), or at a single point (at or under the surface).

Generally speaking, introduction at a single point may be selected in the case of a single reactor or the first reactor of a series, communication between two successive reactors preferably being achieved by means of a spillway.

The inlet or admission area can be delimited from the remainder of the reactor by a siphon-shaped baffle 1B (or a jet breaker plate, achieving a siphon effect). This siphon-shaped baffle dissipates upstream turbulent kinetic energy, essentially in the case of introduction at a single point, and changes the flow direction (to vertical instead of horizontal).

A first reagent, such as a coagulant (for example a mineral salt such as an iron or aluminum salt) may be introduced into this highly turbulent area in order to facilitate its dispersion. The manner of introducing this reagent (or any other reagent) depends on how the raw fluid to be treated is introduced: single-point or multipoint injection over the whole of the width of the admission area.

Central Area 2

This is the area of maximum turbulence inside the flow-guide in which the various components are intimately mixed.

Using a flow-guide means that a single agitator 8 can be used on each shaft, regardless of the depth of the liquid.

The tube has an axis z-z of symmetry and preferably has a constant and advantageously cylindrical section, which here is a circular section (i.e. it is cylindrical in the common sense of the term), but may have other shapes, for example a polygonal shape.

This tube, which is completely immersed in the bath, is preferably vertical (the axis z-z is therefore vertical), although inclined (or even horizontal) directions are possible if the general configuration of the reactor as a whole, including its inlet/outlet, makes this desirable.

Figure 4:
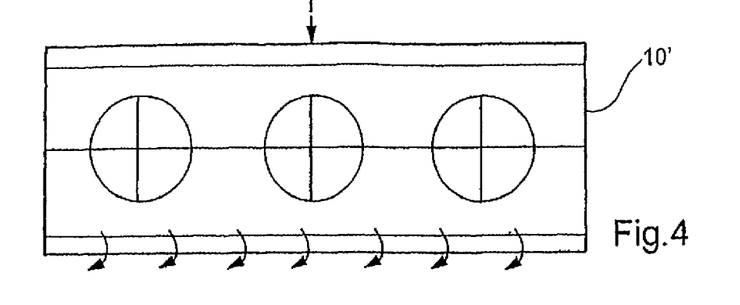
FIG. 4 is a diagrammatic plan view of a reactor that is a variant of the reactor shown in FIGS. 1 and 2.

As shown in FIG. 4, a plurality of agitators equipped with flow-guides may be installed in the same vat, as a function of requirements and if the longitudinal and transverse dimensions of the vat allow it. The number of agitators to be disposed in each direction (longitudinal and transverse) depends on the ratio between the diameter of the mobiles of the agitators and the corresponding dimensions, the maximum diameter itself being a function of the depth of the liquid.

It is particularly advantageous if the agitator causes a vertical downward flow.

The flowrate pumped by all of the agitators, which advantageously represents from 1 to 20 times the through-flowrate (that between the inlet and the outlet), is aspirated at the top of the tube 2A (or tubular sheath) and discharged towards the bottom of the reactor, and thus in a downward flow. This means that the reagent or reagents can be injected at the surface, at a single point or through a perforated annular tube, shown diagrammatically at 14, coaxial with the tube 2A and disposed at the inlet thereof at its upper end. Here a flocculating reagent is injected through this perforated tube, but it may instead be injected at the inlet, between the inlet and the central area, or even at the inlet of the tube.

The agitator 8 is advantageously disposed at the mid-height of the tube, which preferably has a diameter from 102% to 120% of that of the agitator.

The diameter is advantageously at most equal to 60% and at least equal to 40% of the largest horizontal dimension of the peripheral area, and is preferably of the order of 50% thereof. The hydraulic diameter of the central area is from 40% to 60% of the average dimension of the vat.

Its lower end advantageously faces the bottom at a distance from $\frac{1}{3}$ to $\frac{2}{3}$ of the diameter of the tube, and the same applies to the distance between the surface and the level of the upper end of the tube. These distances are advantageously of the order of 50% of the diameter of the tube.

The cruciform baffle 5 disposed under the flow-guide is formed of a plurality of vertical walls 5A extending from a common edge 7 that is substantially aligned with the axis Z-Z of the agitator. This is a static system to oppose continued rotation of the flow leaving the flow-guide tube; it channels the flow, divides it angularly into a plurality of equal parts, and prevents the formation of a circular current at the bottom of the apparatus. Eliminating the radial effect that is the cause of this rotation of the flow has the parallel effect of increasing the axial effect and thus of increasing the pumped flowrate without increasing power consumption. This also prevents particles accumulating in the corners formed by the cruciform baffle.

The cruciform baffle advantageously has a diameter from 75% to 125% of the diameter of the tube. Its walls extend over a significant fraction (at least $\frac{2}{3}$) of the distance between the bottom of the vat and the outlet of the tube, preferably over substantially the whole of that distance.

Here the cruciform baffle is formed of four walls joining at a right angle (thus at 90%), two of which are preferably disposed transversely to the direction of flow between the inlet and the outlet of the vat. In a variant that is not shown the cruciform baffle may include a different number of baffles, only three baffles or five baffles or even more.

Peripheral Area 3

Situated outside the flow-guide tube, this area is characterized by the upward movement of the pumped liquid (which has been well mixed but is still only in the process of flocculation), low speed and turbulence and good homogeneity, which means that the required process may be completed within a time period that has been minimized.

The disposition of the baffles 6A and 6B at the surface, transversely to the through-flow, eliminates the rotational movement formed at the surface and preferentially directs the whole of the incoming flow of fluid towards the flow-guide tube, guaranteeing that the raw fluid to be treated passes through the flow-guide tube at least once in order to be mixed with the recirculated flow and the injected reagents.

The vertical baffles extend over only a portion of the height of the central area, and therefore of the height of the bath, preferably over 40% to 60% of the height thereof and advantageously over the upper half of the bath (especially when the inlet and the outlet are in the upper portion, as in the situation shown here). They advantageously extend between the surface and the level at which the agitator is disposed inside the tube.

In a variant that is not shown there may be a greater number of these baffles, for example three (or even four (or even more)) baffles disposed between the inlet and the outlet and angularly distributed in a regular or irregular manner.

Outlet Area 4

This area is opposite the inlet area and preferably at the same height and advantageously includes a siphon-shaped baffle 4B and an immersed spillway 4A generally covering the whole of the width of the reactor.

Disposed at an optimum distance and at an appropriate immersion depth, by producing an appropriate upward speed, these devices minimize bypassing and dissipate turbulence that compromises treatment carried out downstream of the reactor (for example if that treatment requires phase separation).

Appropriate partitioning of the space between the siphon-shaped baffle and the downstream wall (not shown) ensures a flowrate that is evenly distributed over the whole length of the spillway.

Specific Configurations

The reactor shown in FIGS. 1 and 2 is advantageously followed by a separation area. Various configurations may be used.

Figure 3:
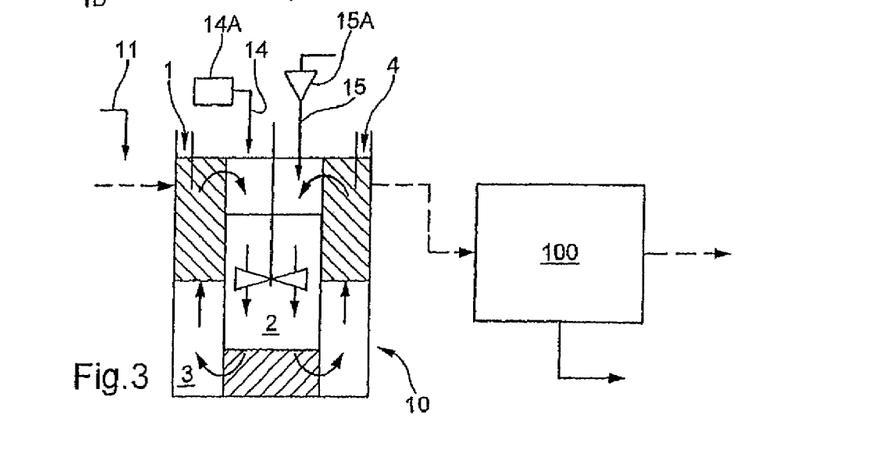
FIG. 3 is a diagram of a water treatment installation using the reactor shown in FIGS. 1 and 2.

FIG. 3 is a diagram representing the reactor 10 followed by a separation area 100 of this kind.

It must be clearly understood that it is possible to connect in series a plurality of reactors like that of FIGS. 1 and 2, depending on the specific requirements.

In FIG. 3, entry is from the left, downstream of a coagulating reagent injection line 11, if any, and into a shaded area diagrammatically representing the portion of the peripheral area in which upward flow is confined angularly by the baffles 6A and 6B and in which mixing with the incoming raw fluid to be treated occurs. The diagram shows at 14 the injection of flocculating reagent from a source 14A into the central area (not shaded) and at 15 the optional injection of powder from a source 15A of granular material. After flocculation, fluid leaves the right-hand portion of the peripheral area (shaded) and enters the separation area, in which the flocculated fluid is separated into clarified effluent and sludge containing the flocs formed in the reactor 10.

The raw fluid to be treated is preferably water, which is in principle pre-coagulated by injecting a coagulating reagent such as an iron or aluminum salt via the line 11 or into an upstream vat fed by overflow or underflow.

It is advantageous to inject powder to encourage the formation of flocs from impurities in suspension, colloidal impurities and dissolved impurities in the raw fluid to be treated. This material is preferably a ballast consisting of a granular material that is insoluble (or only very slightly soluble) in water and heavier than the raw fluid to be treated. This material is preferably sand, advantageously with a particle size range from 20 to 300 microns.

FIG. 4 represents another reactor 10' including three flux-guide tubes in the same vat combined with a static system such as the cruciform baffle shown FIGS. 1 and 2. The expression "flocculation area" refers to the area formed conjointly by each central area defined by a tube and the peripheral area around it, and the FIG. 4 reactor includes a plurality of flocculation areas disposed in parallel between an inlet (at the top in the drawing) and an outlet (at the bottom in the same drawing).

Figures 5, 7:
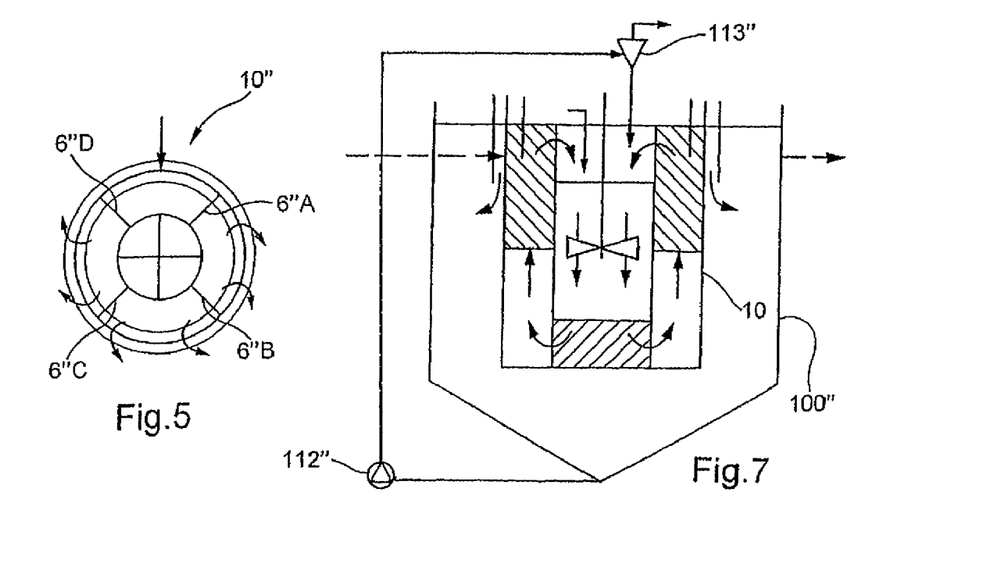
FIG. 5 is a diagrammatic plan view of a reactor that is also a variant of the reactor shown in FIGS. 1 and 2.
FIG. 7 is a diagram of another variant of the installation shown in FIG. 3.

FIG. 5 shows another reactor 10" that is similar to that shown in FIGS. 1 and 2 except that the wall of the vat is cylindrical and the flocculated fluid leaves the vat by overflowing along a large fraction of its periphery. Here there are four lateral deflector baffles 6"A to 6"D delimiting four quarters of the upper portion of the peripheral area, one of which (that at the top in the drawing) is reserved for the entry of raw fluid to be treated and the other three provide an outlet for the flocculated fluid.

Generally speaking, the flocs formed by the intensive mixing grow in the less agitated peripheral area and are partially recycled in the flow-guide before being finally transferred to the sedimentation area.

Figure 6:
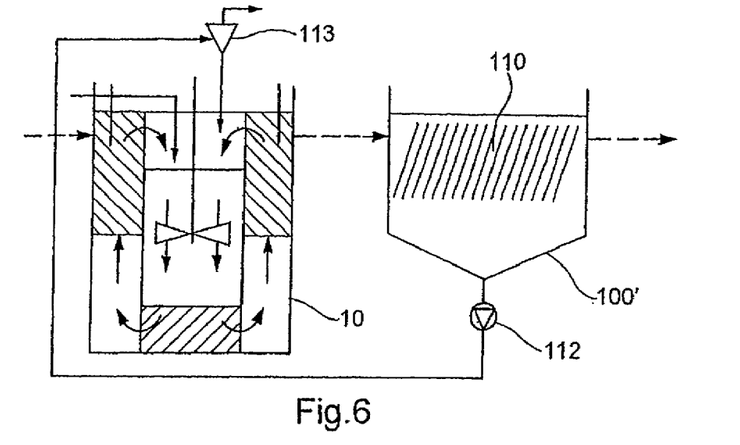
FIG. 6 is a diagram of one variant of the installation shown in FIG. 3.

In the FIG. 6 embodiment, the sedimentation area is a separation vat 100' that is independent of the flocculation reactor 10 and includes sedimentation assisting members 110 that here consist of inclined plates (in a different embodiment these members are omitted); finally, the sludge separated from the clarified effluent, which in practice leaves the separation vat via a spillway, is here pumped by a pump 112 connected by a line to a unit 113 capable of recovering a significant portion of the granular material contained in the sludge, in practice a hydrocyclone or any other suitable system capable of this separation, in which case the unit 113 is part of the powder source (the material injected into the flocculation reactor consists partly of this recovered material and partly of new material, of course).

The powder forms a ballast and is a completely inert material (for example sand, garnet, etc.) or an active material (for example activated carbon powder or resin), which explains why it is sometimes listed in the water treatment "reagents", even if it is sand. As indicated above, it may be injected either at the inlet with the pre-coagulated fluid or in the area upstream of the agitation mobile, preferably at the top of a flow-guide coaxial with that mobile. Injecting ballast means that a single vat with two effective areas can carry out, for example, the ballasted flocculation treatment disclosed in French patents FR 2627704 and FR 2719234, which corresponds to a process sometimes known as the "Actiflo" process, with or without sedimentation assistance plates, thereby reducing the overall implementation cost and minimizing agitation energy requirements. According to tests carried out by the Applicant, and going against the received wisdom of the person skilled in the art, the cruciform baffle of the present invention, by improving agitation efficiency, minimizes the deposition of ballast sand on the bottom of the agitation vat.

FIG. 7 represents another installation for treating raw fluid, typically water. This installation differs from that shown in FIG. 6 essentially in that here the separation area is a vat 100" around the flocculation vat 10, rather than downstream of the vat; the configuration of the reactor 10 is the same as in FIG. 6 and, as in FIG. 6, the powder injected includes material recovered in the sludge pumped from the bottom of the vat 100". In this embodiment there are no sedimentation assistance members, for example sedimentation assistance plates, but the latter could be used.

In a variant that is not shown, the separation area uses a flotation principle, whereby the solids float on the surface of the clarified effluent, rather than sedimentation, whereby the clarified effluent is lighter than the sludge; separation assistance members may also be used here.

Tangential entry of the flocculated fluid into the separation area may also be advantageous, so as to benefit from a vortex effect in addition to the sedimentation effect.

Model-Based Comparative Study of the New Configuration and the Standard Configuration The advantages of the invention have been assessed by a study of the velocity fields, turbulent gradient and treatment time distribution using version 5 of the fluid mechanics simulation program Fluent from Fluent Inc.

Two configurations were studied, based on the same operating conditions, which differed as indicated hereinafter:

1—Highlighting the Advantages of a Surface Inlet-Outlet, a Shorter Rotation Shaft and a Cruciform Baffle Table 1 shows the advantages obtained on changing from a standard configuration A, with an underflow and/or overflow effluent inlet and outlet, to a configuration B conforming to certain aspects of the invention, namely: inlet and outlet at the same height, inclusion of a jet breaker plate and a siphon-shaped baffle, shorter rotation shaft and cruciform baffle placed at the bottom of the vat; note that the maximum and average values of the velocity fields and the turbulent gradient are higher and more homogeneous with the new configuration B.

Benefits of the New Configuration:
increased mixing efficiency for the same energy consumption;
maximum use of the vat volume;
reduced bypass;
facilitated series connection;
elimination of rotation shaft vibration problems as a result of reducing its length;
reduced treatment time;
elimination of the risk of a preferred path in the vat by creating a kinetic energy dissipation outlet area.

2—Highlighting the Advantages of Coupling the Cruciform Baffle, Flow-Guide and Chicane Table 2 shows the advantages obtained, for continuous operation, on changing from a standard configuration C with a single agitator to a configuration D with a vat equipped with a mobile, a cruciform baffle, a flow-guide resting on the cruciform baffle and two chicanes supporting the flow-guide.

Analyzing the velocity fields and the turbulent gradient using the Fluent fluid mechanics simulation software shows that, for the same operating conditions:

The maximum and average values of the velocity fields and the turbulent gradient are higher and more homogeneous with the new configuration D.

Two clearly separate areas are created: a highly agitated area with very high values of the velocity and velocity gradient inside the flow-guide and at the cruciform baffles and a less agitated area outside the flow-guide.

Benefits of the New Configuration:
improved mixing efficiency for the same energy consumption;
creation of two mixing areas differing in terms of mixing level, enabling fast and efficient mixing of a reagent and the fluid in the strongly agitated area and a circulation time in the less agitated area that is the optimum for the reagent to act;
creation of a highly agitated area at the level of the cruciform baffles, returning to suspension solid particles that have settled out, or increasing the interface area in the case of a gas-liquid flow;
reduced bypass;
reduced treatment time.

3—Highlighting the Advantage of Adding the Reagent by Toroidal Injection around the Flow-Guide (FIG. 3, Reference 14)

Graphical simulation of the distribution of a reagent shows that dispersion is improved and faster with annular injection than with single-point injection.

TABLE 1

| Parameter | Ratio A to B | Improvement for B |
|---|---|---|
| Treatment time/average treatment time | 0.9 | +9% |
| Mixing time/average treatment time | 0.79 | +20% |
| Mixing proportion after 1 minute | 0.62 | +40% |
| Average velocity (m/s) | 0.42 | +60% |
| Average turbulent gradient ($s^{-1}$) | 0.21 | +80% |

TABLE 2

| Parameter | Ratio C to D | Improvement for D |
|---|---|---|
| Treatment time/average treatment time | 0.956 | +4% |
| Mixing time/average treatment time | 0.861 | +14% |
| Mixing proportion after 15 minutes | 1 | 0% |
| Average velocity ($m/s^{-1}$) | 0.17 | +83% |
| Average turbulent gradient ($s^{-1}$) | 0.044 | +96% |

The invention claimed is:

1. A water or wastewater treatment system for treating water or wastewater by mixing a reagent with the water or wastewater, the water or wastewater treatment system comprising:
 a. a reactor having a bottom, an inlet, and an outlet;
 b. a flow channel adapted to be immersed within the water or wastewater in the reactor, and generally vertically disposed in the reactor, the flow channel having an open upper end and an open lower end and a surrounding wall structure that permits water or wastewater to enter the open upper end and to flow downwardly through the flow channel and be discharged out the open lower end thereof;
 c. the lower end of the flow channel being spaced from the bottom of the reactor;
 d. an agitator disposed in the flow channel generally between the open upper and lower ends for mixing the reagent with the water or wastewater and for inducing water or wastewater from the reactor into the open upper end, and moving the water or wastewater downwardly through the flow channel to where the water or wastewater is discharged therefrom;
 e. a structure disposed in the vicinity of the lower end of the flow channel for engaging the water or wastewater and causing the flow of the water or wastewater leaving the flow channel and moving upwardly in the reactor to be less turbulent than the water or wastewater in the vicinity of the agitator in the flow channel;
 f. wherein the structure disposed in the vicinity of the lower end of the flow channel is a flow divider that divides the flow of water or wastewater being discharged from the flow channel; and g. wherein the flow divider includes a cruciform baffle having a series of intersecting vertical walls that assume a generally cylindrical configuration.

2. The water or wastewater treatment system of claim 1 wherein the flow channel comprises a tube.

3. The water or wastewater treatment system of claim 2 wherein the flow channel has a generally constant width throughout a substantial section of the length of the flow channel.

4. The water or wastewater treatment system of claim 1 wherein the agitator is disposed generally midway between the upper and lower ends thereof.

5. The water or wastewater treatment system of claim 1 wherein the flow channel has a diameter of approximately 102% to 120% of the diameter of the agitator.

6. The water or wastewater treatment system of claim 1 wherein the flow channel delineates a central area from a peripheral area in the reactor, and wherein the width of the central area forms approximately 40% to 60% of the average width of the combined area of the central area and peripheral area.

7. The water or wastewater treatment system of claim 1 wherein the lower end of the flow channel is spaced from the bottom of the reactor a distance of approximately ⅓ to ⅔ of the diameter of the flow channel.

8. The water or wastewater treatment system of claim 1 wherein the upper open end of the flow channel is adapted to be spaced from the surface of the water or wastewater contained in the reactor a distance of approximately ⅓ to ⅔ of the diameter of the flow channel.

9. The water or wastewater treatment system of claim 1 wherein the distance between the bottom of the reactor and the lower end of the flow channel, and the distance between the upper end of the flow channel and the surface of the water or wastewater contained in the reactor is at least approximately 50% of the diameter of the flow channel.

10. The water or wastewater treatment system of claim 9 wherein the flow divider includes a height equal to approximately at least ⅔ of the distance between the lower end of the flow channel and the bottom of the reactor.

11. The water or wastewater treatment system of claim 1 including a transverse plate facing the inlet and a transverse plate facing the outlet.

12. The water or wastewater treatment system of claim 1 including a reagent injector connected to a supply of a reagent for injecting a reagent into the water or wastewater to be treated.

13. The water or wastewater treatment system of claim 12 wherein the reagent injector is disposed with respect to the inlet and the flow channel to inject a reagent between the inlet and the upper open end of the flow channel.

14. The water or wastewater treatment system of claim 1 including a separator operatively associated with the reactor for receiving water or wastewater from the reactor and separating solids from the water or wastewater.

15. The water or wastewater treatment system of claim 1 including an injector for injecting insoluble granular material into the water or wastewater in the reactor.

16. The water or wastewater system of claim 1 wherein the horizontal distance of the respective vertical walls is approximately ¾ to ⅝ of the radius of the flow channel.

17. A water or wastewater treatment system for treating water or wastewater by mixing a reagent with the water or wastewater, the water or wastewater treatment system comprising:
  a. a reactor having a bottom, an inlet, and an outlet;
  b. a flow channel adapted to be immersed within the water or wastewater in the reactor, and generally vertically disposed in the reactor, the flow channel having an open upper end and an open lower end and a surrounding wall structure that permits water or wastewater to enter the open upper end and to flow downwardly through the flow channel and be discharged out the open lower end thereof;
  c. the lower end of the flow channel being spaced from the bottom of the reactor;
  d. an agitator disposed in the flow channel generally between the open upper and lower ends for mixing the reagent with the water or wastewater and for inducing water or wastewater from the reactor into the open upper end, and generating a vertical turbulent axial movement of the water or wastewater in a rotating flow pattern downwardly through the flow channel to where the water or wastewater is discharged therefrom;
  e. a flow divider extending downwardly from the lower end of the flow channel towards the bottom of the reactor for angularly dividing the flow of water or wastewater into a plurality of parts and generally preventing or eliminating the flow of water or wastewater being discharged from the lower end of the flow channel from continuing to rotate and giving rise to a circular water or wastewater flow currents below the lower end of the flow channel at the bottom of the apparatus;
  f. the flow divider being aligned with the agitator and including a plurality of vertical baffles that extend generally from the lower end of the flow channel towards the bottom of the reactor;
  g. the vertical baffles of the flow divider extending outwardly from a center portion of the flow divider and wherein the center edge portion of the flow divider is generally aligned with the agitator; and
  h. wherein the baffles engage the flow of water or wastewater being discharged from the lower end of the flow channel and angularly divide the flow of water or wastewater being discharged from the flow channel into a plurality of parts where each divided part of the water or wastewater flow passes generally between at least two baffles.

* * * * *